US012199347B2

(12) United States Patent
Desclos et al.

(10) Patent No.: US 12,199,347 B2
(45) Date of Patent: Jan. 14, 2025

(54) NULL STEERING ANTENNA TECHNIQUES FOR ADVANCED COMMUNICATION SYSTEMS

(71) Applicant: Kyocera AVX Components (San Diego), Inc., San Diego, CA (US)

(72) Inventors: Laurent Desclos, San Diego, CA (US); Sebastian Rowson, San Diego, CA (US)

(73) Assignee: Kyocera AVX Components (San Diego), Inc., San Diego, CA (US)

( * ) Notice: Subject to any disclaimer, the term of this patent is extended or adjusted under 35 U.S.C. 154(b) by 558 days.

(21) Appl. No.: 17/121,030

(22) Filed: Dec. 14, 2020

(65) Prior Publication Data

US 2021/0175640 A1 Jun. 10, 2021

Related U.S. Application Data

(63) Continuation of application No. 15/935,672, filed on Mar. 26, 2018, now Pat. No. 10,868,371.
(Continued)

(51) Int. Cl.
*H01Q 1/38* (2006.01)
*H01Q 1/24* (2006.01)
(Continued)

(52) U.S. Cl.
CPC ............ *H01Q 25/04* (2013.01); *H01Q 1/243* (2013.01); *H01Q 1/38* (2013.01); *H01Q 3/44* (2013.01);
(Continued)

(58) Field of Classification Search
None
See application file for complete search history.

(56) References Cited

U.S. PATENT DOCUMENTS 4,079,379 A 3/1978 Piesinger
4,675,685 A 6/1987 Finken
(Continued)

FOREIGN PATENT DOCUMENTS

CN 101471711 7/2009
CN 101471711 A * 7/2009 ............ H01Q 1/007
(Continued)

OTHER PUBLICATIONS

Supplementary European Search Report for EP 18770671, mailed on Dec. 7, 2020, 10 pages.
(Continued)

*Primary Examiner* — Dameon E Levi
*Assistant Examiner* — Anh N Ho
(74) *Attorney, Agent, or Firm* — Dority & Manning, P.A.

(57) ABSTRACT

Antenna systems having adaptive antenna arrays for use in wireless communication devices are provided. In one example implementation, the antenna system includes a first antenna array include a plurality of antenna elements. The antenna system includes a second antenna array including a plurality of antenna elements. The first and second antenna arrays are each disposed about the periphery of the wireless device. At least one of the first and second antenna arrays is an adaptive antenna array having an active multi-mode antenna. The active multimode antenna can be adapted for configuration in one of a plurality of possible modes. The active multi-mode antenna is associated with a distinct radiation pattern when configured in each of the plurality of possible modes.

10 Claims, 21 Drawing Sheets

Related U.S. Application Data

(60) Provisional application No. 62/522,109, filed on Jun. 20, 2017, provisional application No. 62/476,640, filed on Mar. 24, 2017.

(51) Int. Cl.

| | |
|---|---|
| ***H01Q 3/44*** | (2006.01) |
| ***H01Q 21/00*** | (2006.01) |
| ***H01Q 21/20*** | (2006.01) |
| ***H01Q 21/29*** | (2006.01) |
| ***H01Q 25/04*** | (2006.01) |

(52) U.S. Cl.
CPC ......... *H01Q 21/0075* (2013.01); *H01Q 21/20* (2013.01); *H01Q 21/29* (2013.01)

(56) References Cited

U.S. PATENT DOCUMENTS

| | | | | |
|---|---|---|---|---|
| 5,552,798 | A | 9/1996 | Dietrich | |
| 6,765,536 | B2 | 7/2004 | Phillips et al. | |
| 6,987,493 | B2 | 1/2006 | Chen | |
| 7,068,234 | B2 | 6/2006 | Sievenpiper | |
| 7,215,289 | B2 | 5/2007 | Harano | |
| 7,830,320 | B2 | 11/2010 | Shamblin | |
| 7,911,402 | B2 | 3/2011 | Rowson et al. | |
| 8,362,962 | B2 | 1/2013 | Rowson et al. | |
| 8,446,318 | B2 | 5/2013 | Ali et al. | |
| 8,648,755 | B2 | 2/2014 | Rowson et al. | |
| 8,717,241 | B2 | 5/2014 | Shamblin et al. | |
| 8,878,728 | B1 | 11/2014 | Livadaru et al. | |
| 9,065,496 | B2 | 6/2015 | Rowson et al. | |
| 9,231,669 | B2 | 1/2016 | Desclos et al. | |
| 9,240,634 | B2 | 1/2016 | Rowson et al. | |
| 9,425,497 | B2 | 8/2016 | Pajona et al. | |
| 9,439,151 | B2 | 9/2016 | Zhu et al. | |
| 9,479,242 | B2 | 10/2016 | Desclos et al. | |
| 9,590,703 | B2 | 3/2017 | Desclos et al. | |
| 9,755,305 | B2 | 9/2017 | Deslos et al. | |
| 9,755,580 | B2 | 9/2017 | Desclos et al. | |
| 2007/0205955 | A1 | 9/2007 | Korisch | |
| 2007/0279286 | A1 | 12/2007 | Coutts et al. | |
| 2010/0295743 | A1 | 11/2010 | Pu et al. | |
| 2011/0193761 | A1* | 8/2011 | Shinkai ................ H01Q 25/005 | 343/836 |
| 2013/0050056 | A1 | 2/2013 | Lee et al. | |
| 2013/0099987 | A1* | 4/2013 | Desclos ................... H01Q 3/00 | 343/745 |
| 2013/0135162 | A1* | 5/2013 | Shamblin ................. H01Q 9/06 | 343/745 |
| 2013/0135163 | A1* | 5/2013 | Desclos ................. H01Q 1/243 | 343/893 |
| 2013/0237294 | A1 | 9/2013 | Periyalwar et al. | |
| 2014/0162655 | A1 | 6/2014 | Hong | |
| 2014/0197998 | A1 | 7/2014 | Govindasamy et al. | |
| 2014/0306859 | A1* | 10/2014 | Desclos ................. H01Q 5/385 | 343/822 |
| 2015/0048979 | A1 | 2/2015 | Asrani et al. | |
| 2015/0122886 | A1 | 5/2015 | Koch | |
| 2016/0365632 | A1 | 12/2016 | Lee | |
| 2016/0380355 | A1 | 12/2016 | Lysejko | |
| 2017/0338557 | A1* | 11/2017 | Desclos ................. H01Q 25/00 | |
| 2018/0040952 | A1 | 2/2018 | Desclos et al. | |
| 2018/0351253 | A1* | 12/2018 | Shamblin ............... H01Q 3/247 | |
| 2019/0089053 | A1 | 3/2019 | Yong | |

FOREIGN PATENT DOCUMENTS

| | | | |
|---|---|---|---|
| CN | 103730732 | | 4/2014 |
| CN | 104253310 | | 12/2014 |
| CN | 106099392 | | 11/2016 |
| JP | 2002135036 | | 8/2003 |
| JP | 2006333069 | | 12/2006 |
| KR | 20070058005 | | 6/2007 |
| KR | 20130082353 | | 7/2013 |
| KR | 20130082353 | A * | 7/2013 |
| KR | 20150095864 | | 8/2015 |

OTHER PUBLICATIONS

PCT International Search Report for corresponding PCT Application No. PCT/US2018/24317, mailed on Jun. 6, 2018, 8 pages.

PCT International Preliminary Report on Patentability for corresponding PCT Application No. PCT/US2018/24317, issued on Sep. 24, 2019, 7 pages.

* cited by examiner

NULL STEERING ANTENNA TECHNIQUES FOR ADVANCED COMMUNICATION SYSTEMS

CROSS-REFERENCE TO RELATED APPLICATIONS

This patent application is a continuation of U.S. patent application Ser. No. 15/935,672 filed on Mar. 26, 2018, titled "NULL STEERING ANTENNA TECHNIQUES FOR ADVANCED COMMUNICATION SYSTEMS," which claims benefit of priority with U.S. Provisional Application Ser. No. 62/476,640, filed Mar. 24, 2017; and further claims benefit of priority with U.S. Provisional Application Ser. No. 62/522,109, filed Jun. 20, 2017; the contents of which are hereby incorporated by reference.

FIELD

The present disclosure relates to wireless communications, and more particularly, to antenna systems and methods for wireless communications.

BACKGROUND

Cellular networks operating at 4G, and Wireless Local Area Networks (WLANs), are in abundant use and have recently evolved to provide moderate to high data-rate transmissions along with voice communications in a stable and reliable network over large regions and throughout urban areas. Mobile user devices, such as cellular phones and tablets, have progressed to a point of providing not only voice communications and low data-rate text and email service, but also high data-rate internet connectivity. The next evolutionary step in mobile and high data-rate communication systems is the transition to 5G protocol and networks. 5G networks can provide substantially higher data-rates and lower latency, and can be applicable for voice, data, and Internet of Things (IoT) applications. In addition, millimeter wave (mmWave) spectrum has been opened up for use to allow for larger instantaneous bandwidth to support higher data-rates. These mmWave bands, along with the sub-6 GHz bands currently used for 4G cellular and WLAN applications, may be used with 5G systems.

SUMMARY

One example aspect of the present disclosure is directed to an antenna system for use in a wireless device having a periphery associated therewith. The antenna system includes a first antenna array include a plurality of antenna elements. The antenna system includes a second antenna array including a plurality of antenna elements. The first and second antenna arrays are each disposed about the periphery of the wireless device. At least one of the first and second antenna arrays is an adaptive antenna array having an active multi-mode antenna. The active multimode antenna can be adapted for configuration in one of a plurality of possible modes. The active multi-mode antenna is associated with a distinct radiation pattern when configured in each of the plurality of possible modes.

DETAILED DESCRIPTION

Figure 1:
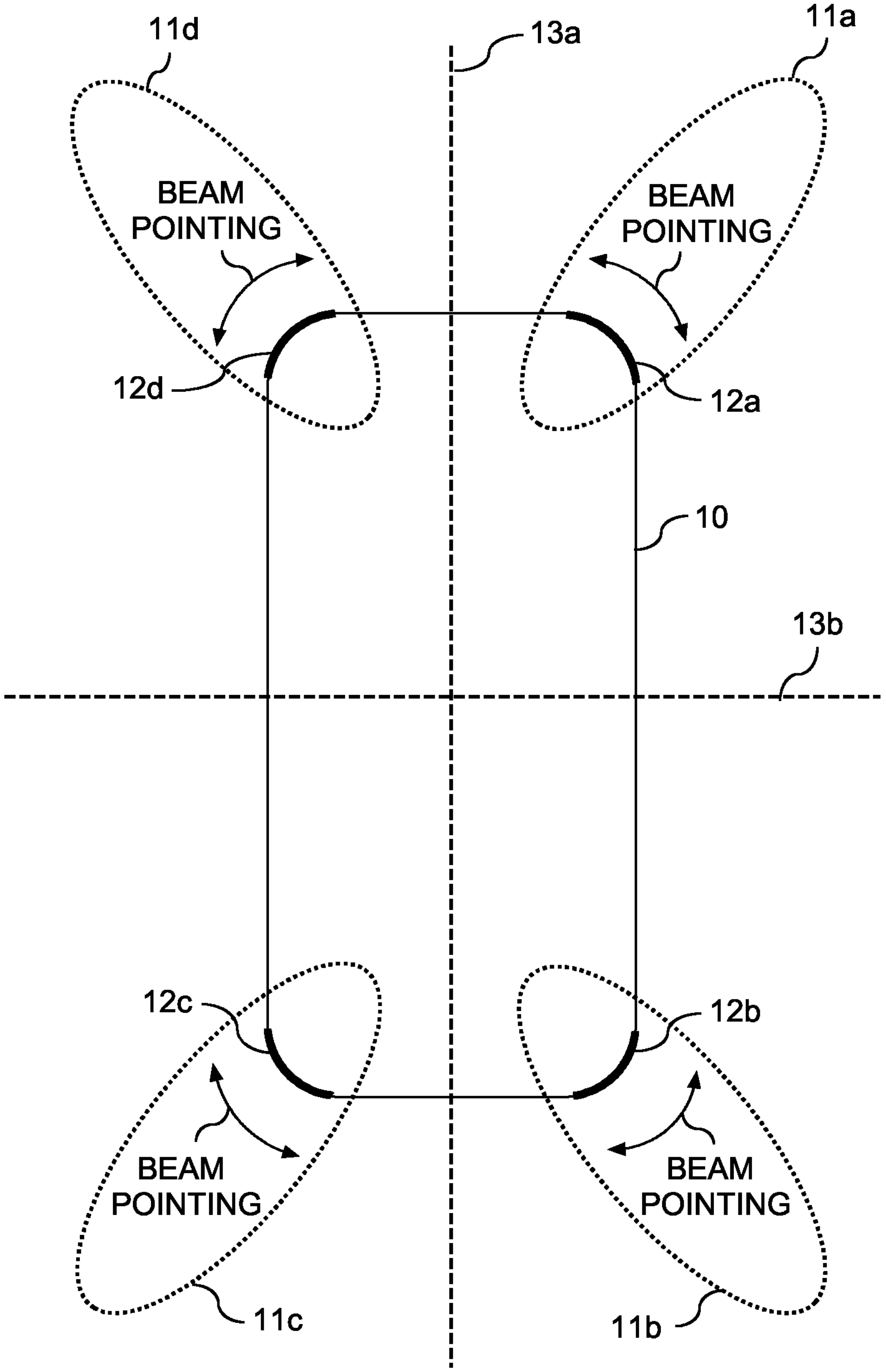
FIG. 1 shows a planar wireless device having a periphery extending about all sides thereof, and a plurality of antenna arrays are positioned about the periphery and configured for beam pointing within a plane of the planar wireless device.

For purposes herein, the term "wireless device" includes any device capable of communication over a wireless network or wireless communication link. A "mobile wireless device" refers to a device capable of communicating over a wireless network or wireless communication link that is capable of being carried by hand of a user during operation. Example mobile wireless devices include smartphones, cellular phones, tablets, wearable devices, PDAs, electronic readers, and the like. The term "periphery" as used herein includes the outer limits or edge of a planar area of a wireless device. An "antenna array" refers to a plurality of antennas operating together. An "array pattern" refers to a radiation pattern associated with an antenna array. An array pattern can also be referred to as an array beam for the antenna array. An "adaptive antenna array" refers to an antenna array with one or more multi-mode antennas that can be controlled to adjust the array pattern associated with the antenna array.

Example aspects of the present disclosure are directed to an adaptive antenna array technique applicable to small form factor wireless devices (e.g., mobile wireless devices) where dynamic control of the antennas of the array is implemented to improve antenna system performance. Dynamic control of the radiation mode of the antenna elements forming array can be used to improve gain for the intended communication link, mitigate interference from non-intended sources, and/or improve communication link reliability by bringing antenna pattern and polarization diversity to the mobile antenna system.

In some embodiments, an antenna system includes an array having one or more active multi-mode antennas (also termed "modal antennas"). In some aspects several antenna arrays can be integrated into a wireless device and coverage of these antenna arrays can be coordinated to provide seamless communication system coverage as the device is rotated or re-positioned. For higher frequency communication systems (e.g., mmWave systems) multiple antenna arrays can be integrated into a wireless device (e.g., a mobile wireless device) to provide full angular coverage around the device. A beam steering methodology along with a hand-off methodology between the multiple arrays can be used for increased performance during system operation.

In some embodiments, a multi-mode antenna can be a single port antenna system capable of generating multiple radiation pattern modes, wherein the radiation pattern modes are de-correlated when compared to each other. Arraying a plurality of multi-mode antennas together can result in an array that has a substantially larger number of individual beam states compared to an antenna array formed from single radiation mode antenna elements, such as passive antennas. The multiple radiation patterns generated by the multi-mode antennas can be used to form a plurality of different array radiation patterns for the wireless device. The multi-mode antennas can be used to form and control the location of nulls and/or lobes in the array radiation pattern. The nulls can be positioned to provide interference suppression from RF interferers, for example, by steering a null in a direction of the interferer.

In some embodiments, each multi-mode antenna in the array can be connected to a front-end module (FEM). The FEM can include a power amplifier (PA) and low noise amplifier (LNA). The FEM can interface with one or more processors to control the multi-mode antennas to provide an adaptive array. The adaptive array implementation along with multi-mode antennas used to populate the elements of the array can provide a high degree of flexibility in terms of forming a beam and forming nulls in the array radiation pattern.

In some embodiments, one or multiple linear arrays are positioned on or near the periphery of a wireless communication device, such as a mobile wireless communication device. These arrays can include multiple antenna elements. One or more of the elements can be a multi-mode antenna capable of generating one of multiple radiation patterns from a plurality of possible modes.

A FEM can be connected to each element of the array or a number of elements in the array, allowing for the configuration of an adaptive array. This linear array configuration provides array pattern generation and control in one plane, with a wide beam width pattern in a second plane distinct from the device plane. The second plane can be but is not always orthogonal to the plane of the array. A control routine (e.g., an algorithm) can be configured for execution by one or more processors (e.g., a central processing unit (CPU)) within or coupled to the wireless device to form and position a main beam from the adaptive array to increase communication link performance (e.g., increase gain, mitigate interference, etc.). In some embodiments, the control routine can be configured to control the other arrays integrated into the device and coordinate hand-off of the antenna system function from one array to another.

In some embodiments, one or multiple two-dimensional (2D) arrays are positioned on a wireless device, such as a mobile wireless device. The array configuration can be of the type such that a linear array is positioned along the periphery of the device and additional rows of elements are positioned on or near the front or rear surface of the device. The 2D array configuration provides the capability of scanning the array main beam in multiple planes, allowing control of the beam in azimuth and elevation. A control routine can be configured to form and position a main beam (e.g., lobe) from the adaptive array to increase communication link performance (e.g., increase gain, mitigate interference). Additionally, the control routine can control the other arrays integrated into the device and coordinate hand-off of the antenna system function from one array to another.

In some embodiments, the control routine can access or obtain one or multiple signal quality metrics from one or more processors (e.g., a baseband processor). The control routine can uses these metrics to make array pattern steering decisions. The metric(s) can include a channel quality indicator (CQI), receive signal strength indicator (RSSI), Signal to Interference plus Noise Ratio (SINR), bit error rate (BER), data rate, other metric(s), or a combination of any of the foregoing, that provide information regarding the propagation channel and/or communication system performance. The one or more processors can include a baseband processor, application processor, or other processor resident in the communication system or connected to the communication system. The control routine can provide control signal settings to the multi-mode antennas to alter the antenna mode and array radiation pattern based on the metrics.

In some embodiments, the control routine can be configured to specifically determine multi-mode antenna array pattern states that reduce interference in the communication system connected to the multi-mode antenna array from sources such as communication systems or other sources of RF transmission in the field of view of the multi-mode antenna array. In some implementations, the control routine can use the CQI, RSSI, and/or SINR to model the propagation channel for each of the available possible radiation pattern of each antenna array. With the propagation channel modeled for each available possible array beam combination, the control routine can predict which radiation pattern, among the multiple radiation patterns of adaptive antenna array, will provide the best performances and/or improved performances for the next data communication exchange. Especially, if the SINR metric is being maximized, near maximized, or increased by the control routine, the level of interferences can be taken into account and the radiation pattern chosen can be radiation pattern that provides a good communication link with the intended transceiver and/or reduces interference from undesired RF sources.

In some embodiments, the control routine can control hand-off of the antenna system duties from one array to another array on the wireless communication device. In some implementations, the control routine can use the CQI, RSSI, and/or SINR to model the propagation channel for each of the available possible antenna array beam combinations. With the propagation channel modeled for each available possible radiation pattern beam combination and for each antenna array, it the control routine can predict which radiation pattern, among the multiple radiation patterns of the adaptive antenna array and among all arrays, can provide the best performances for the next data communication exchange. For instance, the control routine can predict when a current radiation pattern for a first combination of antenna arrays will deliver less performances than the radiation pattern combination for a second combination of antenna arrays. A threshold delta (difference) in signal quality or performance can be set. An appropriate array can be selected for use when handing off to the array would cause a delta in signal quality or performance that meets the threshold. Active multi-mode antennas in the array, or a plurality of arrays, are each configured for increased performance across the mode set of respective multi-mode antennas to improve the hand-off process. For instance, the modes can be selected to reduce the time required for hand-off by increasing the delta in signal qualities between arrays.

In some embodiments, multi-mode antennas can be configured to operate as a hybrid array, wherein one FEM can be connected to two or more multi-mode antennas. The two or more multi-mode antennas can be operated as a sub-array and beam-steering coefficients can be determined to drive the grouping of two or more multi-mode antennas in the hybrid array. The modes of each multi-mode antenna can be surveyed and a mode that provides increased communication link performance can be selected.

In some embodiments, the array pattern can be adjusted according to device use case, such as to correct for hand and head loading, or device orientation. For instance, when the control routine does not rely on channel modelization and prediction to anticipate what is the best radiation pattern beam combination among all possibilities and among all antenna arrays, a deterministic approach can be used. In that deterministic approach, the radiation pattern can be chosen among the different possible radiation pattern of each array and among the different antenna arrays, based on sensor information. Look up tables, storing the performances of the different possible radiation pattern, of the different antenna arrays, versus different use cases, including device orientation, impact of the head, hand, can be used.

Device use case, such as hand and head loading, can be determined in a variety of manners, such as using one or more proximity sensors, accelerometers, or other motion sensors. One or more processors can received signals from the sensors and can implement a control routine to determine a use case of the device based on the signals. The one or more processors can then determine a mode of operation of one or more of the active multi-mode antennas in the system based at least in part on the use case of the wireless device.

One example embodiment of the present disclosure is directed to an antenna system for use in a wireless device having a periphery associated therewith. The antenna system includes a first antenna array including a plurality of first antennas. The antenna system includes a second antenna array including a plurality of second antennas. The first and second antenna arrays are each disposed about the periphery of the wireless device. At least one of the first and second antenna arrays is an adaptive antenna array including an active multi-mode antenna. The active multi-mode antenna can have a single feed port. The active multi-mode antenna can be adapted for configuration in one of a plurality of possible modes. The active multi-mode antenna can be associated with a distinct radiation pattern when configured in each of the plurality of possible modes.

In some embodiments, each of the first and second antenna arrays is an adaptive antenna array including an active multi-mode antenna. The active multi-mode antenna can have a single feed port. The active multi-mode antenna can be adapted for configuration in one of a plurality of possible modes. The active multi-mode antenna can be associated with a distinct radiation pattern when configured in each of the plurality of possible modes.

In some embodiments, the adaptive antenna array is coupled to one or more processors (e.g., via a FEM or other intervening elements). The one or more processors can be configured to execute control routine (e.g., by executing computer-readable instructions stored in one or more memory devices) to implement a control routine. In some embodiments, the control routine is operable to control the mode of the active multi-mode antenna to position a main beam of an array radiation pattern of the adaptive antenna array. For instance, the control routine can be operable to control the mode of the active multi-mode antenna based at least in part on one or more signal quality metrics (e.g., CQI, RSSI, SINR, etc.). In some embodiments, the one or more processors are configured to execute a control routine operable to coordinate handoff between the first antenna array and the second antenna array.

In some embodiments, the one or more processors are in communication with one or more sensors. The one or more processors can be operable to determine a use case for the wireless device based at least in part on the one or more sensors. The one or more processors can be configured to execute a control routine to control the adaptive antenna array based at least in part on the use case. In some embodiments, the adaptive antenna array is configured for beam pointing (e.g., steering of the main lobe of the antenna array) within the plane of the wireless device.

In some embodiments, the adaptive antenna array is arranged on a substrate having a first side and a second side that intersect each other at a junction. In some implementations, the active multi-mode antenna can be arranged on one of the first side or the second side. In some implementations, the active multi-mode antenna can include a first active multi-mode antenna arranged on the first side and a second active multi-mode antenna arranged on the second side. In some embodiments, the adaptive antenna array is arranged on an annular structure.

In some embodiments, the antenna system includes one or more multi-face antennas disposed on a planar surface within the periphery of the wireless device. The planar surface can be a front planar surface or a rear planar surface of the wireless device. In some embodiments, a distance between each of the first antennas and each of the second antennas is a distance between λ and λ/4. λ is a wavelength associated with a frequency of operation of the first antennas and the second antennas.

Another example embodiment of the present disclosure is directed to an antenna system for use in a wireless communication device having a periphery. The antenna system includes a first adaptive antenna array having a plurality of first antenna elements disposed on the periphery of the wireless communication device. The first adaptive antenna array includes a first active multi-mode antenna being adapted for configuration in one of a plurality of possible modes. The first active multi-mode antenna is associated with a distinct radiation pattern when configured in each of the plurality of possible modes. The first adaptive antenna array is associated with a first array pattern. The system includes a second adaptive antenna array having a plurality of second antenna elements disposed on the periphery of the wireless communication device. The second adaptive antenna array includes a second active multi-mode antenna being adapted for configuration in one of a plurality of possible modes. The second active multi-mode antenna is associated with a distinct radiation pattern when configured in each of the plurality of possible modes. The second adaptive antenna array is associated with a second array pattern. The system includes one or more processors configured to execute a control routine operable to control the first adaptive antenna and the second adaptive antenna to control the first array pattern and the second array pattern. In some embodiments, the control routine is operable to control the first adaptive antenna and the second adaptive antenna for beam pointing about an azimuth associated with the wireless communication device.

In some embodiments, the antenna system includes a third adaptive antenna array located on a planar surface of the wireless communication device. The third adaptive antenna array includes a third active multi-mode antenna being adapted for configuration in one of a plurality of possible modes. The third active multi-mode antenna is associated with a distinct radiation pattern when configured in each of the plurality of possible modes. The third adaptive antenna array is associated with a third array pattern. In some embodiments, the control routine can be operable to control the first adaptive antenna array, the second adaptive antenna array, and the third adaptive antenna array for azimuth beam control and elevation beam control for the wireless device.

In some embodiments, the control routine is operable to control the first adaptive antenna array and the second adaptive antenna array based on a use case of the wireless communication device. The use case can be determined based at least in part on one or more signals from a sensor (e.g., proximity sensor, accelerometer, etc.) located on the wireless communication device.

With reference now to the FIGS., example embodiments will now be set forth. FIG. 1 shows a planar wireless device 100 (e.g., mobile wireless device) having a periphery 10 extending about all sides thereof. The device 100 includes a plurality of antenna arrays 12(*a-d*) positioned about the periphery. The plurality of antenna arrays 12(*a-d*) are configured for beam pointing within a plane of the planar wireless device. Each of the antenna arrays has an array pattern 11(*a-d*) associated therewith. The device embodies a vertical axis 13*a* and a horizontal axis 13*b* forming a device plane. The antenna arrays 12(*a-d*) each include an active multi-mode antenna. The active multi-mode antenna can have having a single feed port and can be adapted for configuration in one of a plurality of possible modes where the active multi-mode antenna comprises a distinct radiation pattern when configured in each of the plurality of possible modes. In some embodiments, modes for the active multi-mode antennas are selected to include one of: vertical polarization, horizontal polarization, +45 degree and −45 degree polarization states.

Examples of active multi-mode antennas, also referred to as "modal antennas" or "null steering antennas", are described in commonly owned U.S. Pat. Nos. 9,748,637; 9,240,634; 8,648,755; 8,362,962; and 7,911,402; the contents of each of which is hereby incorporated by reference. Example active multi-mode antennas are described with reference to FIGS. 18-25.

At any given frequency there can be a need to steer the array pattern (beam) of an antenna array. When the array surface is flat, conventional techniques often employ a set of antenna elements with finite spacings therebetween. However, when the surface is an odd-shape (not flat) like many IOT devices, cellphones, and other devices, a different technique can be required to achieve beam steering.

Figure 2:
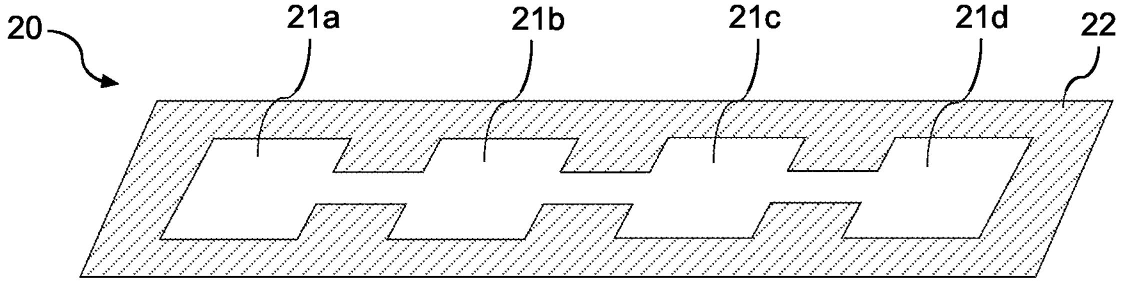
FIG. 2 (Prior Art)
FIG. 2 shows a planar antenna array where an array antenna pattern can be steered using weighted signals to each antenna in the array.

FIG. 2 shows a conventional planar antenna array 20 including a plurality of antenna elements 21(*a-d*) positioned on a substrate 22. An array antenna pattern can be steered by providing weighted signals to each antenna element in the array in accordance with prior art techniques. The weights associated with each of the weighted signals can be controlled (e.g., using one or more processors and/or a FEMs) to achieve a desired steering direction for the array pattern associated with planar antenna array 20.

Figure 3:
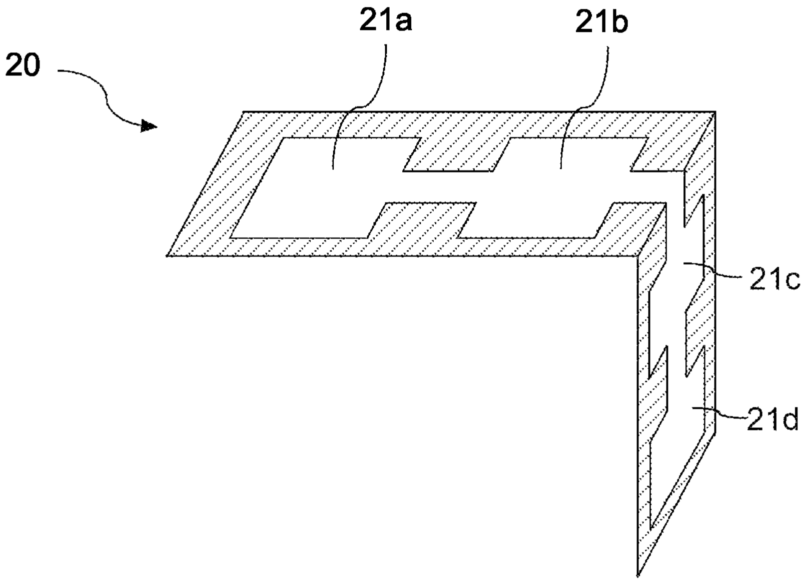
FIG. 3 shows the antenna array of FIG. 2 being bent such that it is difficult to steer an array pattern of the bent antenna array.

FIG. 3 shows the conventional antenna array 20 of FIG. 2 being bent. Because the substrate 22 and antenna array is bent, it can be difficult to steer an array pattern for the antenna array 20using conventional techniques, such as by controlling the weights of weighted signals provided to each of the antenna elements 21(*a-d*) in the array.

Figure 4:
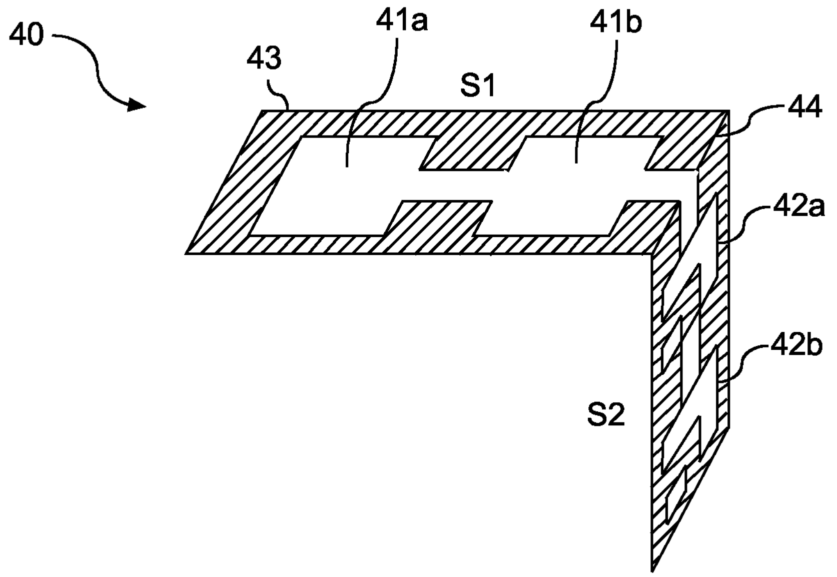
FIG. 4 shows an antenna array having two sides, wherein the two sides are configured to intersect with one another, and wherein one or more active multi-mode antennas are positioned on one of the two sides of the antenna array.

FIG. 4 shows an adaptive antenna array 40 according to example embodiments of the present disclosure. The antenna array can be disposed on a substrate 43 having two sides S1 and S2. The two sides S1 and S2 of substrate 43 are configured to intersect with one another (for example at junction 44). Active multi-mode antennas 42(*a-b*) are positioned on side S2. Passive antenna elements 41(*a-b*) are positioned on side S1. FIG. 4 depicts two active multi-mode antennas 42 on side S2 and two passive antennas on side Si for purposes of illustration and discussion. Those of ordinary skill in the art, using the disclosure provided herein, will understand that it is within the scope of the present disclosure to mix any number of active multi-mode antennas and passive antennas about the first and second sides.

Figure 5:
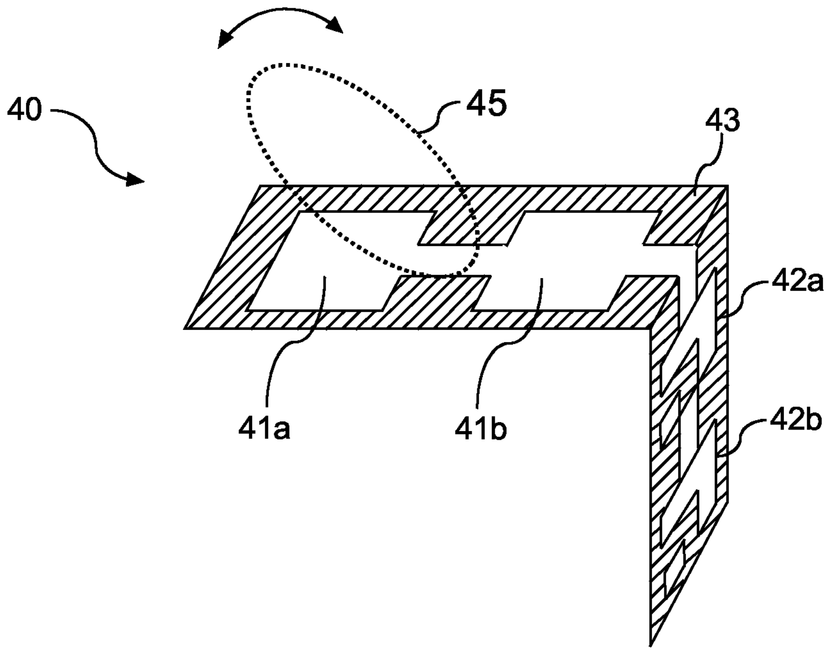
FIG. 5 shows the antenna array of FIG. 4 and an array pattern associated therewith where the multi-mode antennas provide for steering of the array pattern.

FIG. 5 shows the adaptive antenna array 40 of FIG. 4 and an array pattern 45 associated therewith. Multi-mode antennas 42(*a-b*) provide for steering of the array pattern. In this regard, the bent array can achieve the same or similar array pattern steering as achieved with the conventional planar array shown in FIG. 2. The beam steering function of one or more active multi-mode antennas within the bent array allows for beam pointing within the plane of the wireless device (e.g., steering the array pattern such that a main lobe or other lobe is within the plan of the wireless device), since, the array antennas are each positioned about the periphery of the wireless device.

Figure 6:
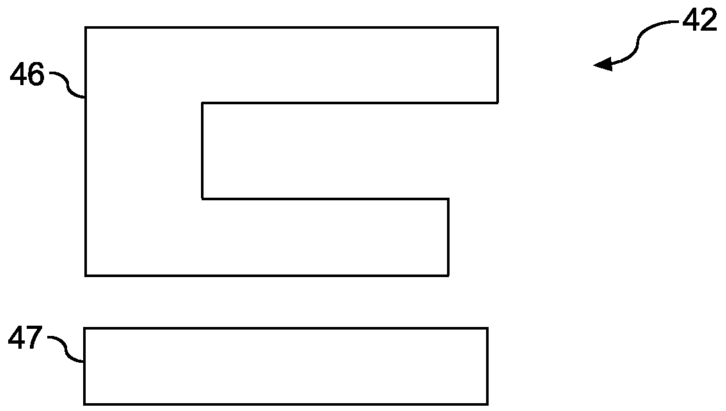
FIG. 6 shows an example of an active multi-mode antenna having a radiating element and a parasitic conductor element according to example embodiments of the present disclosure.

FIG. 6 shows an example of an active multi-mode antenna 42 having a radiating element 46 and a parasitic conductor element 47 that can be used in an adaptive antenna array according to example embodiments of the present disclosure. The radiating element 46 can include a single feed port. In the embodiment of FIG. 6, the radiating element can have a J or U shape. An RF signal can be provided to the radiating element 46 (e.g., from a FEM). The parasitic element 47 can be coupled to an active tuning element. The active tuning element can be, for instance any one or more of voltage controlled tunable capacitors, voltage controlled tunable phase shifters, FET's, switches, MEMs device, transistor, or circuit capable of exhibiting ON-OFF and/or actively controllable conductive/inductive characteristics. The parasitic conductor element 47 can be positioned adjacent to the radiating element 46 and in proximity therewith. The active tuning element can be used vary a reactive load about the parasitic conductor element 47 to achieve a plurality of antenna modes for the active multi-mode antenna 42 of FIG. 6.

Figure 7:
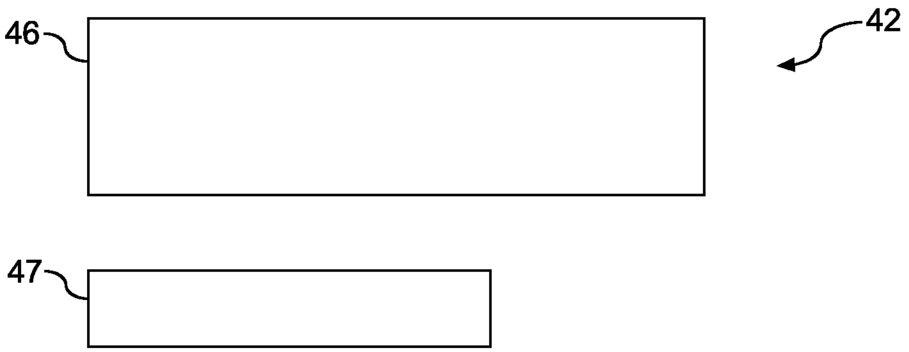
FIG. 7 shows an example of an active multi-mode antenna having a radiating element and a parasitic conductor element according to example embodiments of the present disclosure.

FIG. 7 shows an another example of an active multi-mode antenna 42 having a radiating element 46 and a parasitic conductor element 47 according to example embodiments of the present disclosure. The radiating element 46 can include a single feed port. In the embodiment of FIG. 7, the radiating element 46 can have a linear shape. An RF signal can be provided to the radiating element 46 (e.g., from a FEM). The parasitic element 47 can be coupled to an active tuning element. The active tuning element can be, for instance any one or more of voltage controlled tunable capacitors, voltage controlled tunable phase shifters, FET's, switches, MEMs device, transistor, or circuit capable of exhibiting ON-OFF and/or actively controllable conductive/inductive characteristics. The parasitic conductor element 47 can be positioned adjacent to the radiating element 46 and in proximity therewith. The active tuning element can be used vary a reactive load about the parasitic conductor element 47 to achieve a plurality of antenna modes for the active multi-mode antenna 42 of FIG. 7.

Although illustrative examples are provided in FIGS. 6 and 7, it will be understood by one having skill in the art that a myriad of antenna element architectures will be possible with respect to the active multi-mode antennas. Generally, however, the active multi-mode antenna will comprise a radiating element with a single feed port, and a parasitic conductor element positioned adjacent to the radiating element and in proximity therewith, wherein a reactive load about the parasitic conductor element is modulated to achieve a plurality of antenna modes (see commonly owned patents incorporated by reference, above and example active multi-mode antennas discussed with reference to FIGS. 18 to 25).

Figure 8:
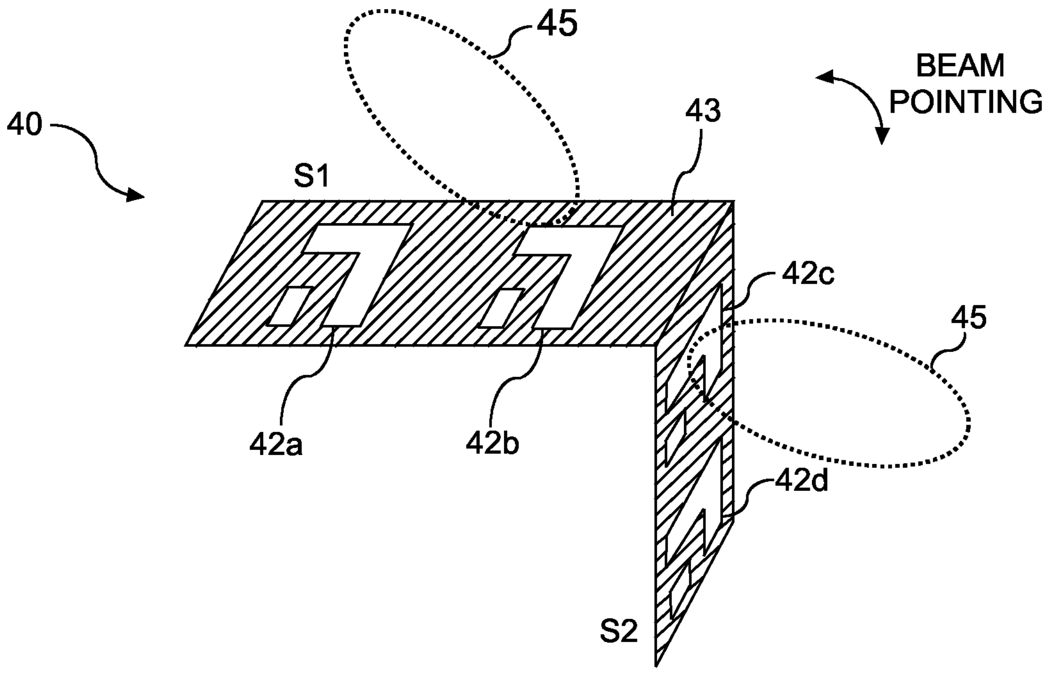
FIG. 8 shows an antenna array having two sides where active multi-mode antennas are positioned about the array at each of the two sides thereof allowing for steering according to example embodiments of the present disclosure.

FIG. 8 shows an antenna array 40 disposed on a substrate 43 having two sides S1 and S2. The array 40 includes active multi-mode antennas 42(*a-d*) positioned about the array 40 at each of the two sides S1 and S2 thereof. Positioning active multi-mode antennas 42(*a-d*) on multiple sides of the array substrate 43 allows for steering of the array pattern 45 with fewer limitations when compared to an antenna array with multi-mode antennas on a single side only.

Figure 9:
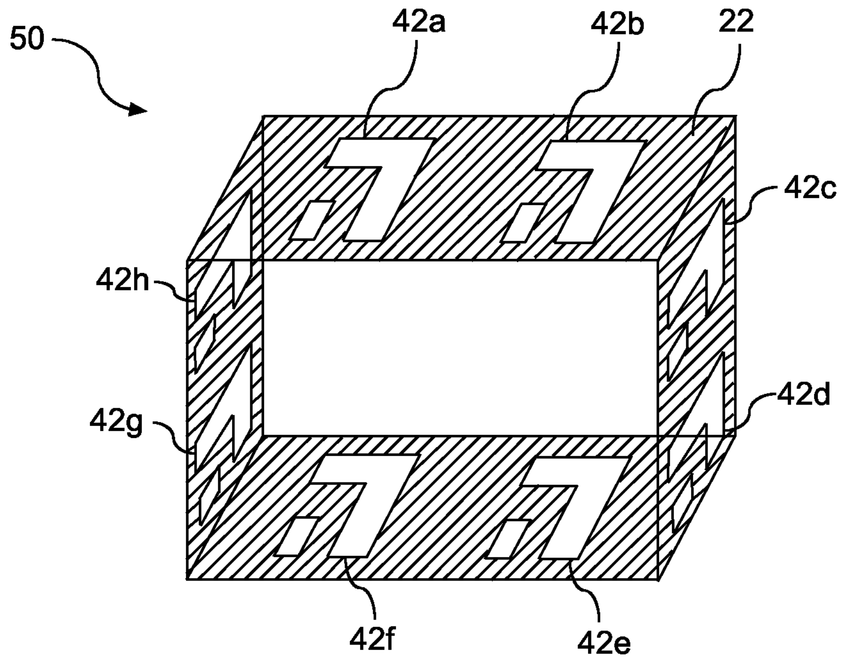
FIG. 9 shows an annular structure including a plurality of antennas positioned about a periphery thereof according to example embodiments of the present disclosure.

FIG. 9 shows an annular structure 50 including a plurality of antennas 42(*a-h*) each positioned about a periphery thereof. One or more of the antennas 42(*a-h*) can be active multi-mode antennas. The antenna array structure 50 can be used for beam pointing in a device plane associated with a wireless device or can be used to provide other beam steering capabilities.

Figure 10:
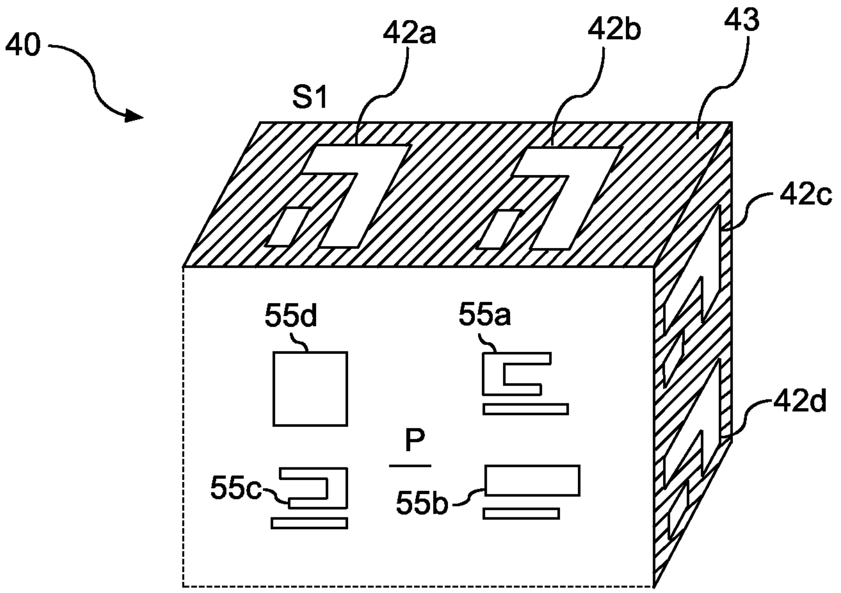
FIG. 10 shows the antenna of FIG. 8 with additional antennas (multi-face antennas) positioned in proximity to the antenna array and positioned relative to a planar surface of the wireless device according to example embodiments of the present disclosure.

FIG. 10 shows the antenna array 40 of FIG. 8 with additional antennas termed "multi-face antennas 55(*a-d*)" positioned in proximity to the antenna array 40 and positioned on a planar surface (P) of the wireless device or surface parallel to a planar surface of the wireless device. The multi-face antennas 55(*a-d*) may include planar antenna elements and may include passive or active multi-mode antennas, or a combination thereof. In some embodiments, multi-face antennas 55(*a-d*) are placed near the rear surface of the wireless device. However, the multi-face antennas 55(*a-d*) can also be positioned near a front surface of the wireless device without deviating from the scope of the present disclosure.

Figure 11:
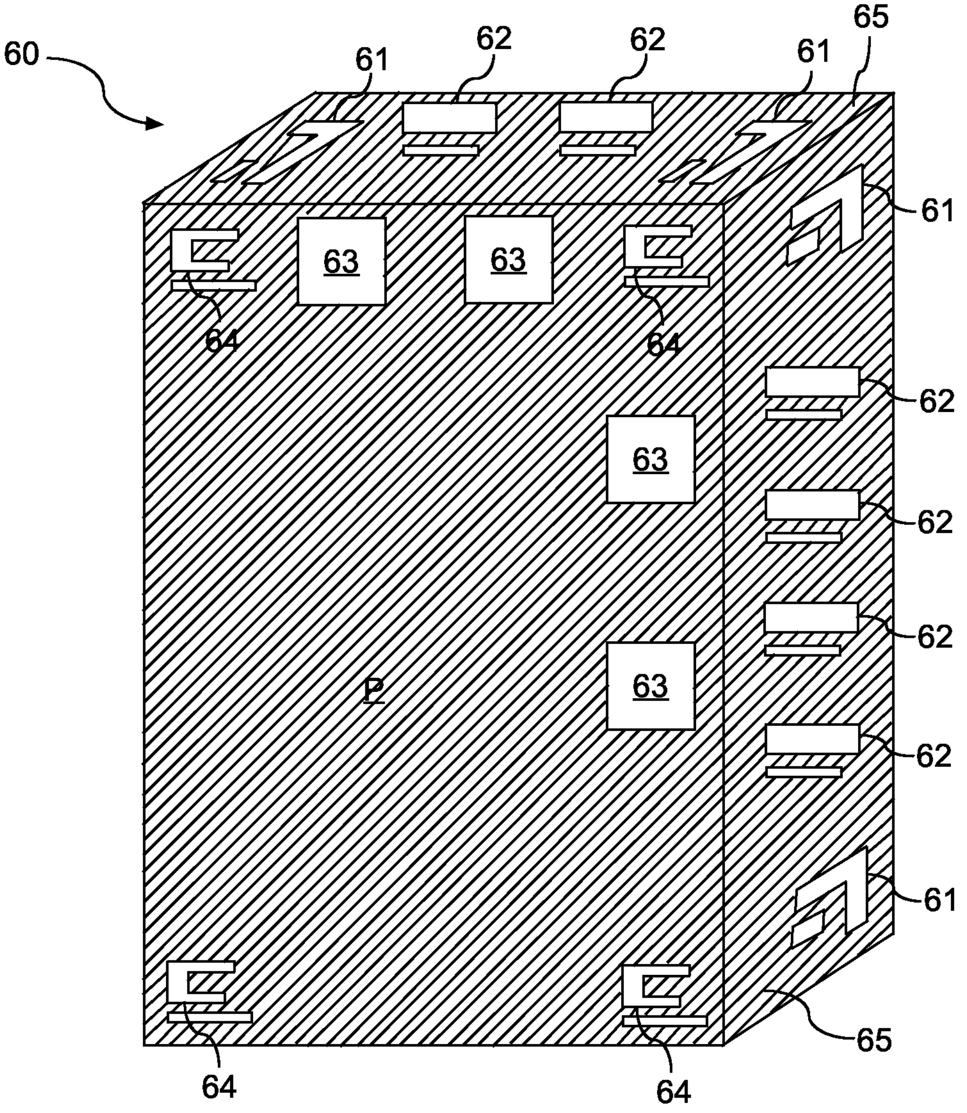
FIG. 11 shows a three-dimensional structure representing a wireless device, wherein each of a plurality of antennas are positioned about the periphery and planar surfaces of the wireless device according to example embodiments of the present disclosure.

FIG. 11 shows a three-dimensional structure 60 representing a wireless device (e.g., a smartphone, tablet, etc.), wherein each of a plurality of antennas are positioned about the periphery 65 and planar surfaces P of the wireless device. The various antenna elements and arrays positioned about the device can include adaptive arrays 61, passive antenna elements 62, passive antenna arrays 63, active multi-mode antennas 64, or any combination thereof. Depending on the frequency and placements, the distance between antenna elements and arrays may be between $\lambda$ and $\lambda/4$, wherein $\lambda$ is the wavelength associated with the respective antennas. As such, in the example of 5G, the antennas can operate at frequencies in the range from 2.5 GHz to 60.0 GHz and can be associated with wavelengths in the range of about 12.0 cm to 1.25 mm, respectively. This type of structure can include a distributed structure with mechanical contacts, or a skin coupled type of structure.

A multi-frequency structure can include a set of active multi-mode antennas at a higher frequency within the lower frequency antennas (shared structure antennas). Distribution could be accomplished through a set of corporate feeds through the rear-side housing or cover. Mechanically, the feed could be either a contact from below, such as a spring connector, or a capacitive coupling component.

Figure 12:
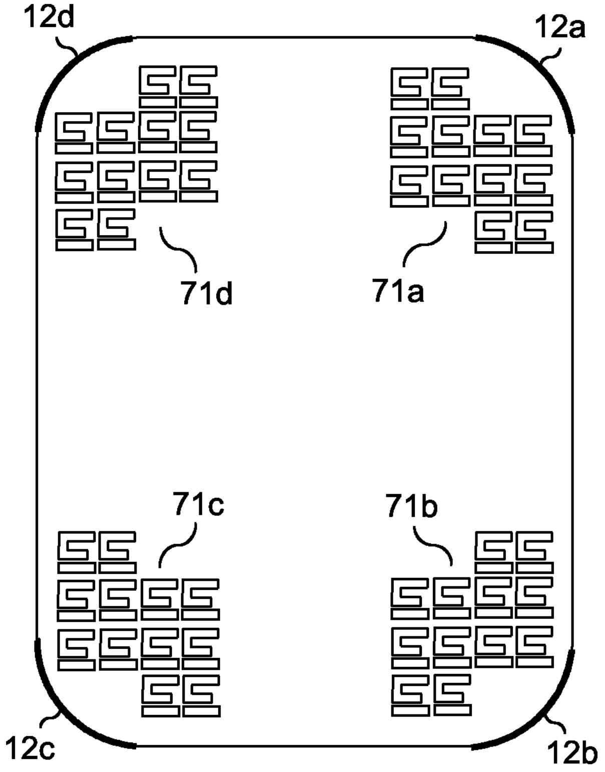
FIG. 12 shows a two-dimensional antenna array system, including a plurality of antenna arrays for controlling antenna performance in the device plane and at least one additional plane that is distinct from the device plane according to example embodiments of the present disclosure.

FIG. 12 shows a two-dimensional antenna array system, including a plurality of adaptive antenna arrays 12(*a-d*) according to example embodiments of the present disclosure for controlling antenna performance in the device plane, and multi-face antenna arrays 71(*a-d*) for controlling antenna performance in at least one additional plane that is distinct from the device plane, for example an orthogonal plane that is orthogonal to the device plane.

Figure 13:
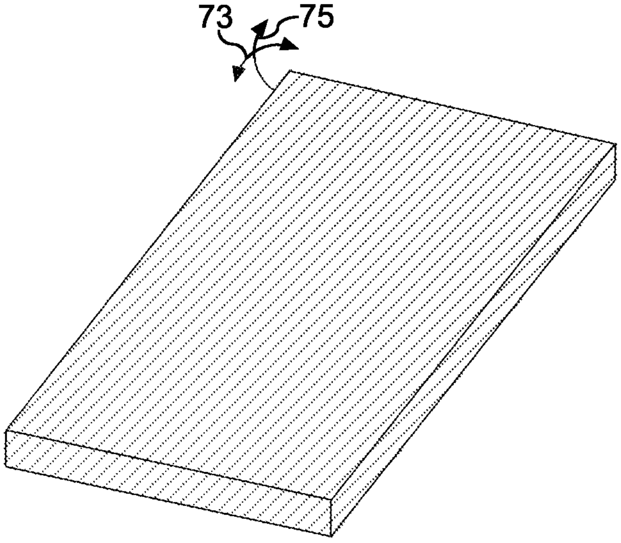
FIG. 13 shows azimuth and elevation beam control for a two-dimensional antenna array system according to example embodiments of the present disclosure.

FIG. 13 shows azimuth and elevation beam control for a two-dimensional antenna array system such as that shown in FIG.12. Arrow 73 illustrates azimuth beam control. Arrow 75 illustrates elevation beam control.

Figure 14:
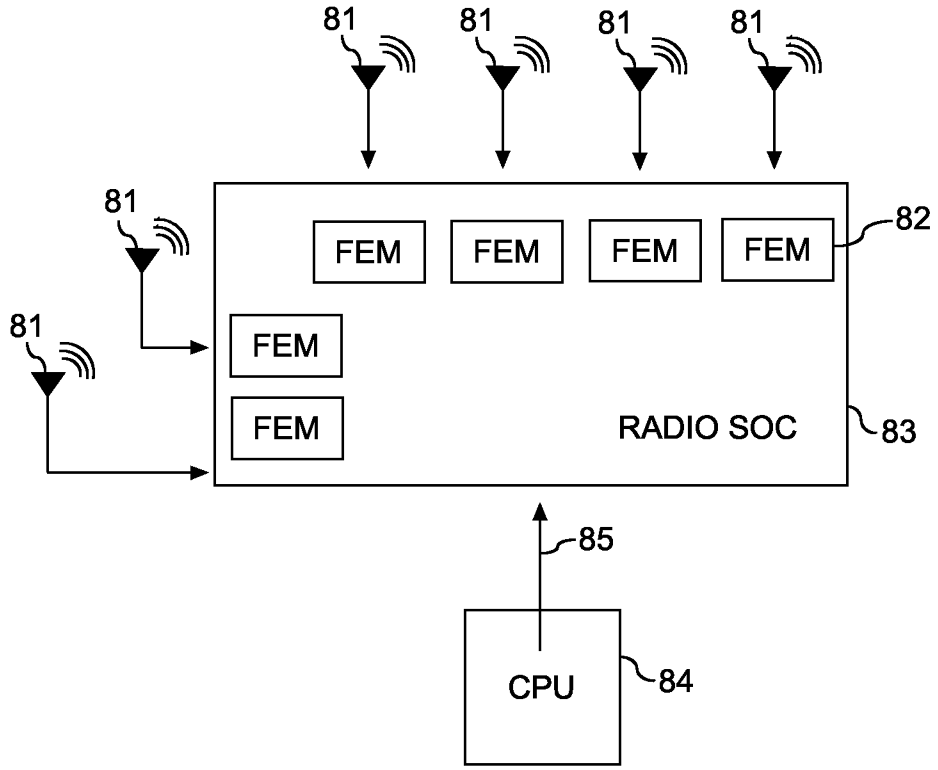
FIG. 14 shows an adaptive antenna array including a radio system on chip (SOC) having a plurality of front end modules where each front-end module (FEM) is coupled to an antenna within an array of antennas and where a processor (e.g., a central processing unit (CPU)) is configured to deliver signals to the radio SOC for controlling the FEM's and performance of the antenna array.

FIG. 14 shows an antenna array including a radio system on chip (SOC) 83 having a plurality of front end modules 82. Each front-end module (FEM) is coupled to a passive antenna 81 within an array of antennas. One or more processor(s) 84 are configured to deliver signals 85 to the radio SOC 83 for controlling the FEM's and performance of the antenna array.

Figure 15:
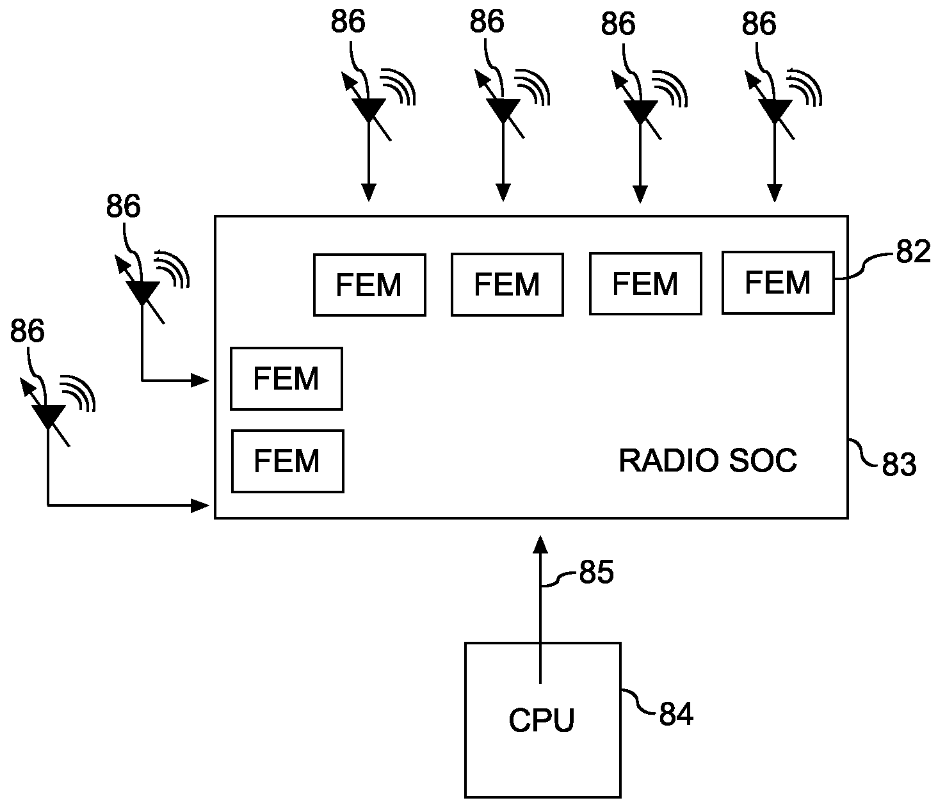
FIG. 15 shows an adaptive antenna array of FIG. 14 wherein the antennas include active-multi-mode antennas according to example embodiments of the present disclosure.

FIG. 15 shows an adaptive antenna array where the antennas comprise active-multi-mode antennas 86. The active multi-mode antennas combine to form the adaptive antenna array. While each of the antennas is shown as including an active multi-mode antenna, it is understood by one with skill in the art that one or more of the antennas may comprise a passive antenna instead of an active multi-mode antenna. As shown in FIG. 15, the adaptive antenna array includes a radio system on chip (SOC) 83 having a plurality of front end modules 82. Each front-end module (FEM) is coupled to a passive antenna 81 within an array of antennas. One or more processor(s) 84 are configured to deliver signals 85 to the radio SOC 83 for controlling the FEM's and performance of the antenna array.

Figure 16:
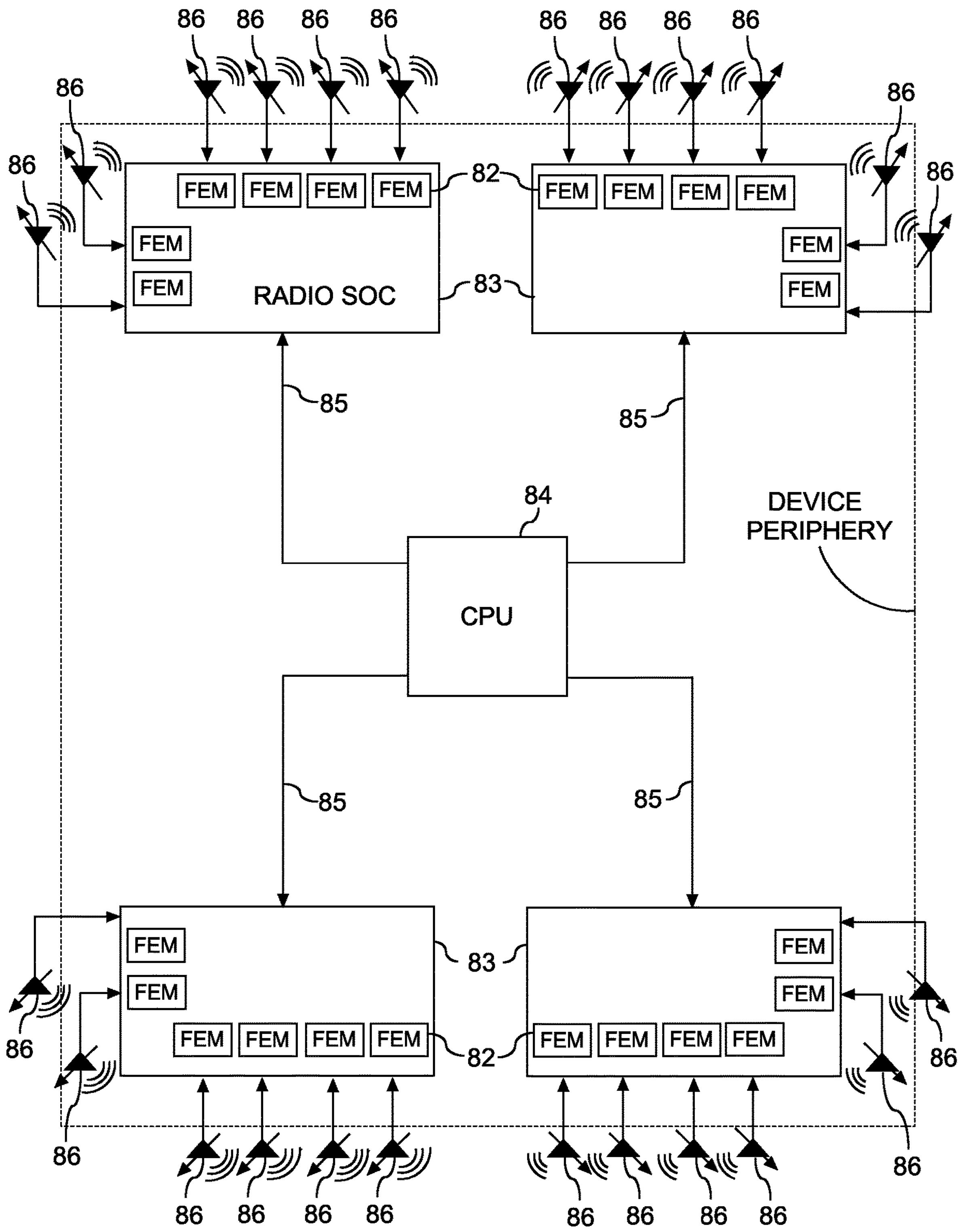
FIG. 16 shows a wireless device having a plurality of adaptive antenna arrays positioned about a periphery thereof according to example embodiments of the present disclosure.

FIG. 16 shows a wireless device having a plurality of adaptive antenna arrays positioned about a periphery thereof, wherein the adaptive antenna arrays are each similar to that shown in FIG. 15. A single processing system having one or more processors (e.g., CPU) 84 is coupled to each of four adaptive arrays and provides signals 85 for controlling modes of the respective multi-mode antennas 86 thereof. Radio SOCs 83 house a plurality of FEMs 82, each FEM coupled to a respective multi-mode antenna 86. Each FEM 82 can include a power amplifier (PA) and low noise amplifier (LNA) for transmit and receive function. An algorithm or control routing in the processing system 84 can provide of all adaptive arrays as well as multi-mode antenna mode selection.

Figure 17:
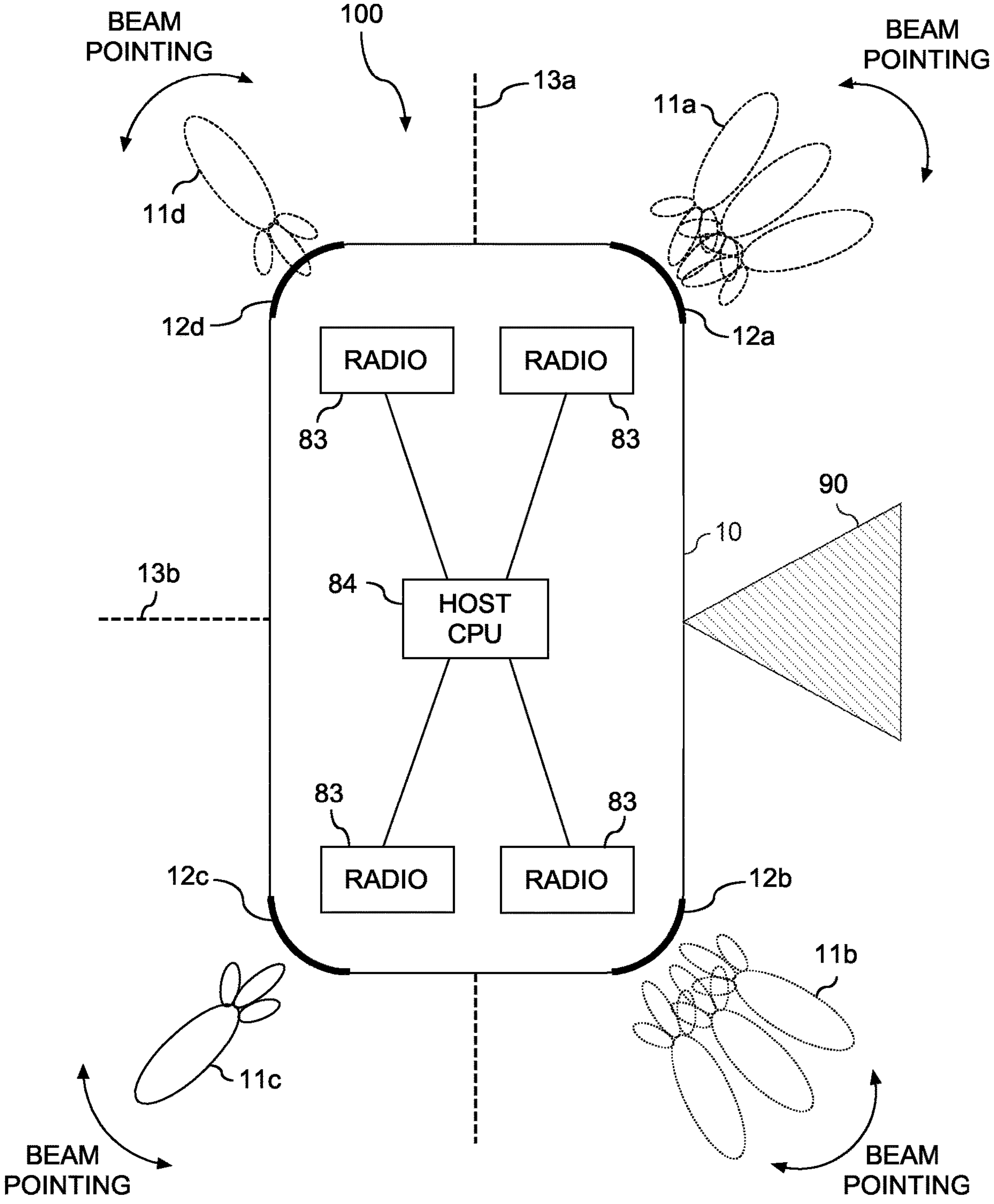
FIG. 17 shows a wireless device having a plurality of adaptive antenna arrays positioned about a periphery thereof where the antenna system achieves a sectorized approach to providing antenna system coverage around the mobile device.

FIG. 17 shows a wireless device 100 (e.g., a mobile wireless device such as a smartphone, tablet, etc.) having a plurality of adaptive antenna arrays 12(*a-d*) positioned about a periphery 10 thereof. Each of the adaptive arrays provides an array pattern 11(*a-d*), respectively. The array patterns are adjusted for beam pointing in the plane of wireless device 100 to effectuate hand-off in the hand-off region 90. This is accomplished using a processing system (e.g., CPU) 84 to send control signals to the various radios 83 coupled to the adaptive antenna arrays. In the illustrated example, the hand-off region 90 is within the device plane defined by vertical axis 13*a* and horizontal axis 13*b* as shown. The antenna system shown in FIG. 17 achieves a sectorized approach to providing antenna system coverage around the mobile device.

Additional features and benefits of the various embodiments may include:

adaptive antenna arrays may be implemented in one or more corners of a wireless device periphery;

modes for the active multi-mode antennas are each selected to include on of: vertical polarization, horizontal polarization, +45 degree and −45 degree polarization states to allow for dynamic control of polarization properties of the array beam;

an algorithm or control routine can be implemented to control the plurality of arrays in the wireless device to pass or hand off beam forming responsibility from one array to another as device orientation and/or position changes;

one or multiple of the arrays can be adaptive antenna arrays, wherein digital beamforming techniques are applied;

beam select modes can be designed into the arrays and control routine can provide an omni-directional mode for searching and selecting pilot signals or signaling required for an initialization phase prior to communicating with a node such as an access point;

the adaptive antenna arrays may be implemented at mmWave frequencies for use in 5G systems;

at lower frequency bands a reduced number of elements can be integrated into the device to provide a phased array, adaptive array, or hybrid array; and as arrays are corrupted by use cases such as, hand-loading of a smartphone, hand and head loading, among others, the modes of operation of the multi-mode antennas can be controlled to compensate for the use case.

Thus, in some embodiments, multiple antenna arrays can be integrated into a wireless communication device and active multi-mode antenna elements can be used to populate some or all antenna elements in the arrays to provide full coverage and connectivity for the radio in the communication device. An algorithm or control routine can be configured to form and position a main beam from the adaptive arrays to optimize for a communication link. Additionally, the control routine can control and coordinate hand-off of the antenna system function used for communications from one array to another. Array beam positions can be selected to increase communication link effective radiated power (EIRP) or for interference suppression. The arrays can be configured along with the control routine to provide continuous beam positioning for a wireless device where orientation and position are dynamically changing. This configuration of multiple arrays is applicable for mmWave applications as well as sub-6 GHz applications such as LTE communications.

Figure 18:
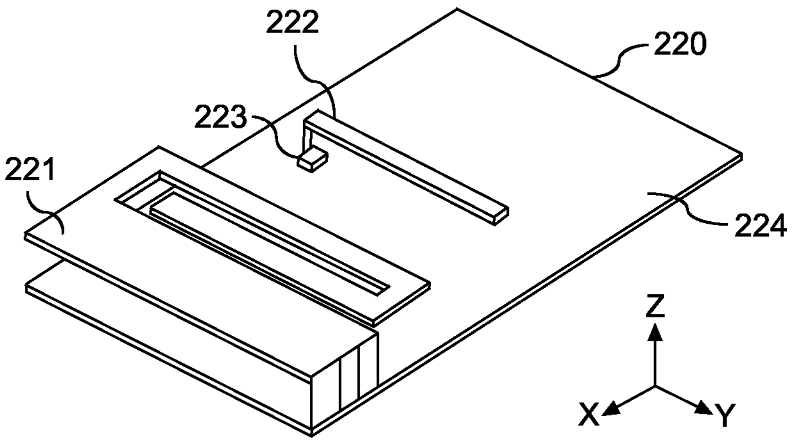
FIG. 18 depicts an example active multi-mode antenna.

FIG. 18 depicts an example active multi-mode antenna 200 according to example embodiments of the present disclosure. The antenna 200 includes a main isolated magnetic dipole (IMD) element 221 that is situated on a ground plane 224. In the example embodiment illustrated in FIG. 18, the antenna 200 further comprises a parasitic element 222 and an active tuning element 223 that are situated on a ground plane 224, located to the side of the main IMD element 221. In this embodiment, the active tuning element 223 is located on the parasitic element 222 or on a vertical connection thereof. The active tuning element 223 can, for example, be any one or more of voltage controlled tunable capacitors, voltage controlled tunable phase shifters, FET's, switches, MEMs device, transistor, or circuit capable of exhibiting ON-OFF and/or actively controllable conductive/inductive characteristics. It should be further noted that coupling of the various active control elements to different antenna and/or parasitic elements, referenced throughout this specification, may be accomplished in different ways. For example, active elements may be deposited generally within the feed area of the antenna and/or parasitic elements by electrically coupling one end of the active element to the feed line, and coupling the other end to the ground portion. The active tuning element 223 can be controlled to provide mode shifting (e.g., beam steering) to adjust a radiation pattern of the antenna 200.

Figure 19:
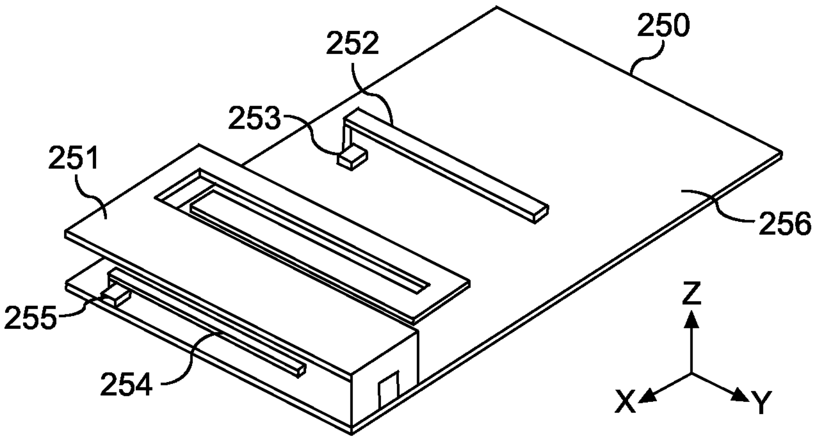
FIG. 19 depicts an example active multi-mode antenna.

FIG. 19 depicts an example active multi-mode antenna 250 according to example embodiments of the present disclosure. The antenna 250 can include a main 1 MB element 251, which is situated on a ground plane 256, a first parasitic element 252 that is coupled with an active tuning element 253, and a second parasitic element 254 that is coupled with a second active tuning element 255. The active tuning elements 253 and 254 can be controlled to provide frequency shifting and/or mode shifting (e.g., beam steering) to adjust a radiation pattern of the antenna 250.

Figure 20:
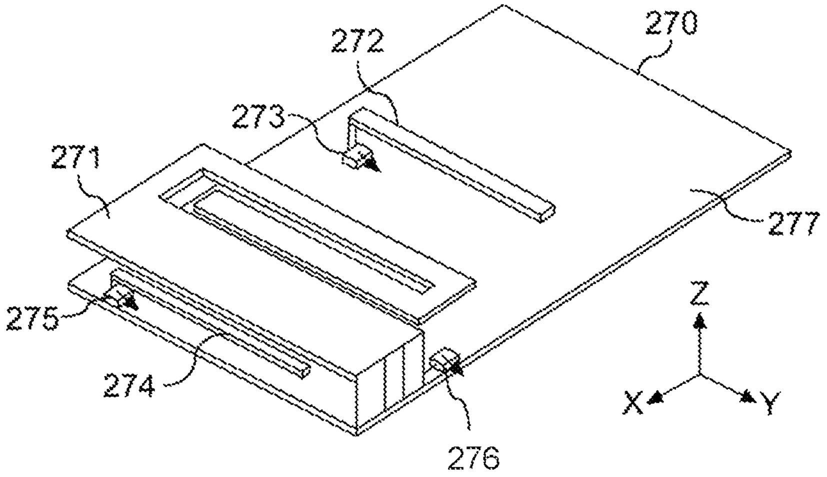
FIG. 20 depicts an example active multi-mode antenna.

FIG. 20 depicts an example active multi-mode antenna 270 in accordance with example embodiments of the present disclosure. The antenna 270 includes an 1 MB 271 that is situated on a ground plane 277, a first parasitic element 272 that is coupled with a first active tuning element 273, a second parasitic element 274 that is coupled with a second active tuning element 275, and a third active tuning element 276 that is coupled with the feed of the main IMD element 271 to provide active matching.

Figure 21:
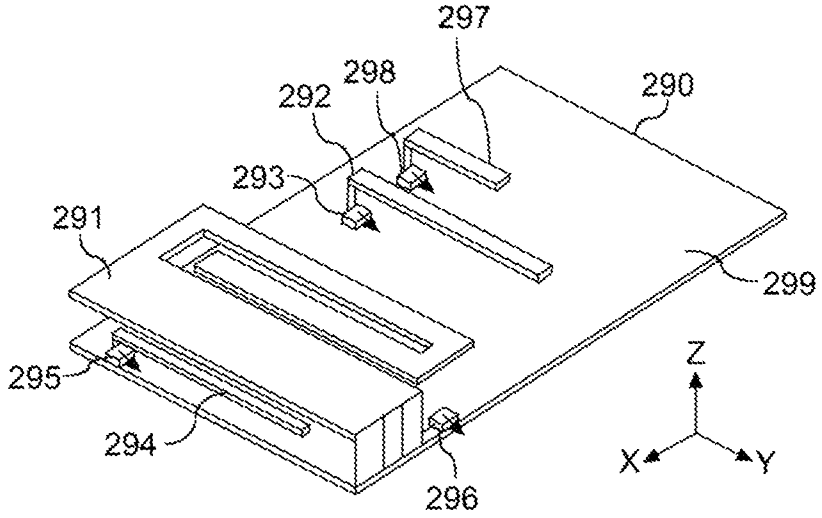
FIG. 21 depicts an example active multi-mode antenna.

FIGS. 21-26 illustrate example active multi-mode antennas with different variations in the positioning, orientation, shape and number of parasitic and active tuning elements to facilitate beam switching, beam steering, null filling, and other beam control capabilities. FIG. 21 illustrates an antenna 290 that includes an 1 MB 291, situated on a ground plane 299, a first parasitic element 292 that is coupled with a first active tuning element 293, a second parasitic element 294 that is coupled with a second active tuning element 295, a third active tuning element 296, and a third parasitic element 297 that is coupled with a corresponding active tuning element 298. In this configuration, the third parasitic element 297 and the corresponding active tuning element 298 provide a mechanism for effectuating beam steering or null filling at a different frequency. While FIG. 21 illustrates only two parasitic elements that are located to the side of the 1 MB 291, it is understood that additional parasitic elements (and associated active tuning elements) may be added to effectuate a desired level of beam control and/or frequency shaping.

Figure 22:
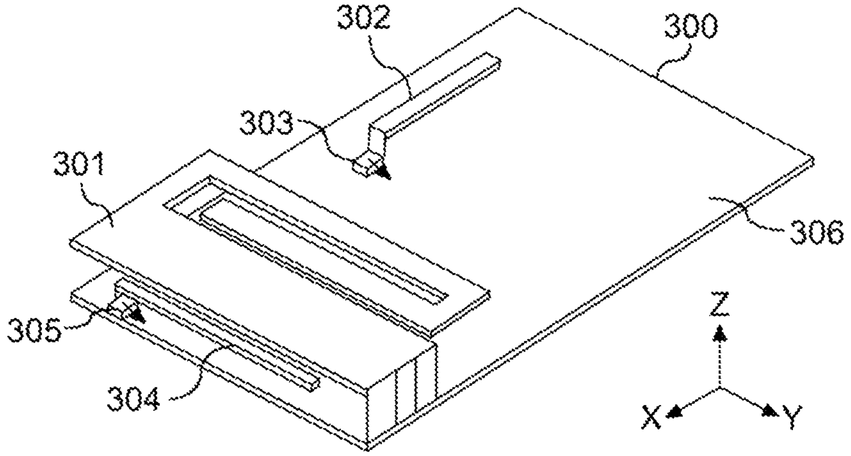
FIG. 22 depicts an example active multi-mode antenna.

FIG. 22 illustrates an example active multi-mode antenna 300 that is similar to the antenna configuration in FIG. 20 except that the parasitic element 302 is rotated ninety degrees (as compared to the parasitic element 52 in FIG. 20). Active tuning element 303 is coupled to parasitic element 302. The remaining antenna elements, specifically, the 1 MB 301, situated on a ground plane 306, the parasitic element 304 and the associated tuning element 305, remain in similar locations as their counterparts in FIG. 20. While FIG. 22 illustrates a single parasitic element orientation with respect to 1 MB 301, it is understood that orientation of the parasitic element may be readily adjusted to angles other than ninety degrees to effectuate the desired levels of beam control in other planes.

Figure 23:
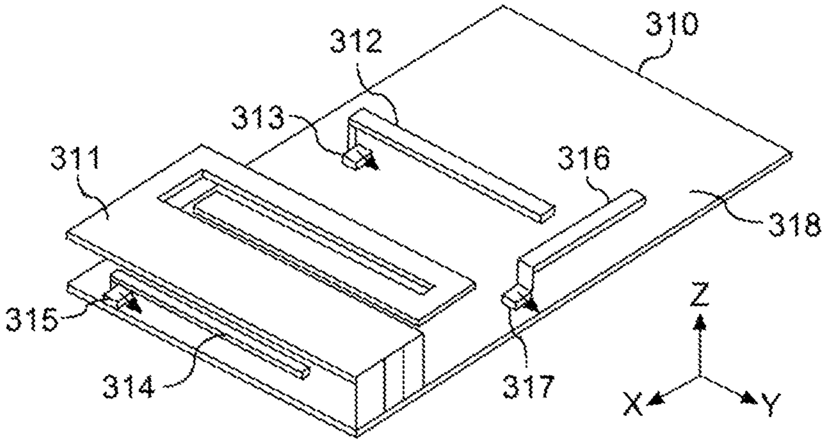
FIG. 23 depicts an example active multi-mode antenna.

FIG. 23 provides another example antenna 310 in accordance example embodiments of the present disclosure that is similar to that of FIG. 22 (a first parasitic element 312 associated with an active tuning element 313), except for the presence a third parasitic element 316 and the associated active tuning element 317. In the example configuration of FIG. 23, the first parasitic element 312 and the third parasitic element 316 are at an angle of ninety degrees with respect to each other. The remaining antenna components, namely the main 1 MB element 311, situated on a ground plane 318, the second parasitic element 314 and the associated active tuning device 315 are situated in similar locations as their counterparts in FIG. 20. This example configuration illustrates that additional beam control capabilities may be obtained by the placement of multiple parasitic elements at specific orientations with respect to each other and/or the main IMD element providing for beam steering in any direction in space.

Figure 24:
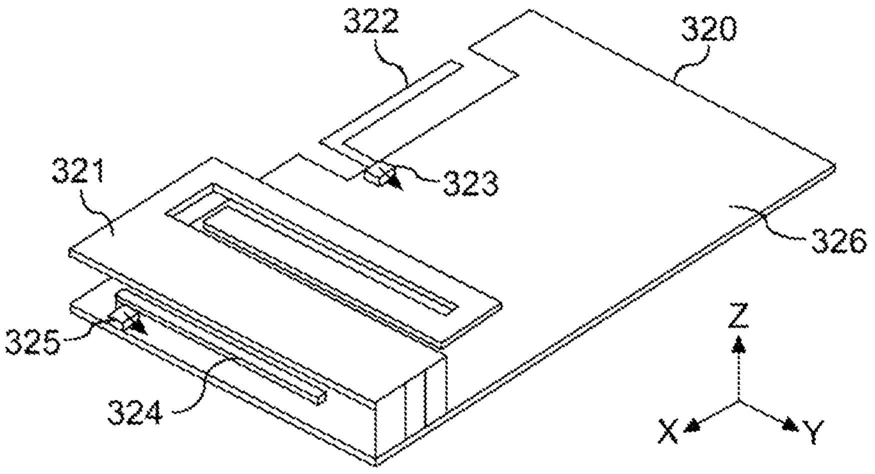
FIG. 24 depicts an example active multi-mode antenna.

FIG. 24 illustrates an active multi-mode antenna 320 in accordance with example embodiments of the present disclosure. This example embodiment is similar to that of FIG. 20, except for the placement of a first parasitic element 322 on the substrate of the antenna 320. The first parasitic element 322 is associated with an active tuning element 323. For example, in applications where space is a critical constraint, the parasitic element 322 can be placed on the printed circuit board associated with the antenna 320. The remaining antenna elements, specifically, the IMD 321, situated on a ground plane 326, and the parasitic clement 324 and the associated tuning element 325, can remain in similar locations as their counterparts in FIG. 20.

Figure 25:
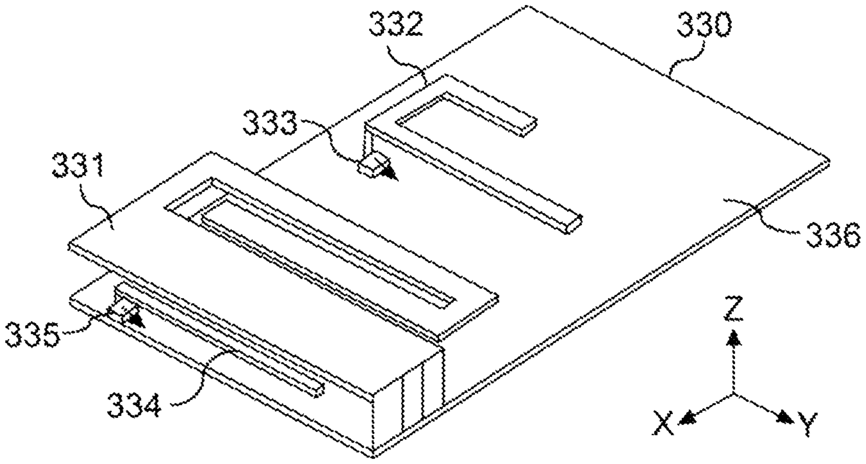
FIG. 25 depicts an example active multi-mode antenna.

FIG. 25 illustrates an active multi-mode antenna 330 in accordance with example embodiments of the present disclosure. Antenna 330 in this configuration, includes an IMD 331, situated on a ground plane 336, a first parasitic element 332 coupled with a first active tuning element 333, and a second parasitic element 334 that is coupled with a second active tuning element 335. The unique feature of antenna 330 is the presence of the first parasitic element 332 with multiple parasitic sections. Thus the parasitic element may be designed to comprise two or more elements in order to effectuate a desired level of beam control and/or frequency shaping. The a parasitic elements can have other shapes without deviating from the scope of the present disclosure.

As previously discussed, the various embodiments illustrated in FIGS. 21 through 25 only provide example modifications to the antenna configuration of FIG. 20. Other modifications, including addition or elimination of parasitic and/or active tuning elements, or changes in orientation, shape, height, or position of such elements may be readily implemented to facilitate beam control and/or frequency shaping and are contemplated within the scope of the present disclosure.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An antenna array comprising:

a substrate having a first portion and a second portion, the first portion oriented in a first plane, the second portion oriented in a second plane that intersects the first plane;

one or more active multi-mode antennas arranged on the first portion of the substrate, the one or more active multi-mode antennas configurable in a plurality of different modes, each of the modes having a distinct radiation pattern, and one or more adaptive antenna arrays and one or more passive antenna arranged on the second portion of the substrate, a distance between the one or more adaptive antenna arrays and the one or more passive antenna be between $\lambda$ and $\lambda/4$, wherein $\lambda$ is a wavelength associated with a frequency of operation of the one or more passive antenna, the wavelength be in the range of about 12.0 cm to 1.25 mm.

2. The antenna array of claim 1, wherein each of the one or more active multi-mode antennas arranged on the first portion of the substrate, each comprises a radiating element and a parasitic conductor element.

3. The antenna array of claim 2, further comprising:

an active tuning element coupled to the parasitic conductor element, the active tuning element configured to vary a reactive load of the parasitic conductor element.

4. The antenna array of claim 1, wherein:

the substrate has a third portion oriented in a third plane that intersects both the first plane and the second plane; and one or more antennas arranged on the third portion of the substrate.

5. The antenna array of claim 4, wherein the one or more antennas arranged on the third portion of the substrate comprise one or more passive antennas.

6. The antenna array of claim 1, wherein the substrate includes a third portion and a fourth portion, the third portion oriented in the first plane such that the third portion is spaced apart from the first portion, the fourth portion oriented in the second plane such that the fourth portion is spaced apart from the second portion.

7. The antenna array of claim 6, further comprising:

one or more antennas arranged on the third portion of the substrate; and one or more antennas arranged on the fourth portion of the substrate.

8. The antenna array of claim 7, wherein the one or more antennas arranged on the fourth portion comprise one or more active multi-mode antennas configurable in the plurality of modes.

9. The antenna array of claim 7, wherein the one or more antennas arranged on the third portion comprise one or more passive antennas.

10. The antenna array of claim 9, wherein the one or more antennas arranged on the fourth portion comprise one or more passive antennas.

* * * * *